US010657656B2

(12) United States Patent
Cavallo et al.

(10) Patent No.: US 10,657,656 B2
(45) Date of Patent: May 19, 2020

(54) VIRTUAL GENERATION OF LABELED MOTION SENSOR DATA

(71) Applicant: International Business Machines Corporation, Armonk, NY (US)

(72) Inventors: Marco Cavallo, New York, NY (US); Ravi Tejwani, Cambridge, MA (US); Patrick Watson, Montrose, NY (US); Aldis Sipolins, New York, NY (US); Jenna Reinen, Greenwich, CT (US); Hui Wu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 16/010,190

(22) Filed: Jun. 15, 2018

(65) Prior Publication Data

US 2019/0385313 A1    Dec. 19, 2019

(51) Int. Cl.
*G06T 7/246* (2017.01)
*G06T 13/40* (2011.01)
*G06T 7/73* (2017.01)
*G06N 20/00* (2019.01)
*G06F 16/78* (2019.01)

(52) U.S. Cl.
CPC .............. *G06T 7/246* (2017.01); *G06F 16/78* (2019.01); *G06N 20/00* (2019.01); *G06T 7/73* (2017.01); *G06T 13/40* (2013.01)

(58) Field of Classification Search
None
See application file for complete search history.

(56) References Cited

U.S. PATENT DOCUMENTS

| 6,377,263 | B1* | 4/2002 | Falacara | G06N 3/006 345/473 |
| 6,535,215 | B1* | 3/2003 | DeWitt | G06T 13/40 345/473 |
| 6,552,729 | B1* | 4/2003 | Di Bernardo | G06T 13/20 345/473 |
| 7,761,269 | B1 | 7/2010 | Kraal et al. | |
| 8,014,565 | B2* | 9/2011 | Gordon | G06F 3/011 345/473 |
| 8,351,646 | B2* | 1/2013 | Fujimura | G06K 9/00214 382/103 |

(Continued)

FOREIGN PATENT DOCUMENTS

| CN | 101840586 B | 4/2012 |
| CN | 103793933 B | 10/2016 |

*Primary Examiner* — Edward Martello
(74) *Attorney, Agent, or Firm* — Amin, Turocy & Watson, LLP

(57) ABSTRACT

Systems, computer-implemented methods, and computer program products to generate virtual motion sensor data from computer animations are provided. A system can comprise a memory that stores computer executable components and a processor that executes the computer executable components stored in the memory. The computer executable components can comprise a tracker component that can track virtual location data corresponding to a feature of a computer animated character in a virtual environment. The computer executable components can further comprise a virtual motion sensor component that, based on the virtual location data, can generate virtual motion sensor data.

20 Claims, 10 Drawing Sheets

(56) References Cited

U.S. PATENT DOCUMENTS

| | | | |
|---|---|---|---|
| 8,467,904 B2 * | 6/2013 | Dariush | B25J 9/1602 |
| | | | 345/474 |
| 8,665,277 B1 | 3/2014 | Dykes | |
| 8,730,245 B2 * | 5/2014 | Lowe | G06T 13/40 |
| | | | 345/473 |
| 8,952,969 B2 | 2/2015 | Isner | |
| 2013/0097103 A1 | 4/2013 | Chari et al. | |
| 2017/0011604 A1 | 1/2017 | Rihn | |
| 2017/0177954 A1 | 6/2017 | Micks et al. | |

* cited by examiner

VIRTUAL GENERATION OF LABELED MOTION SENSOR DATA

BACKGROUND

The subject disclosure relates to computer animation systems, and more specifically, to virtual generation of motion sensor data from computer animations.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate virtual generation of motion sensor data are described.

According to an embodiment, a system can comprise a memory that stores computer executable components and a processor that executes the computer executable components stored in the memory. The computer executable components can comprise a tracker component that can track virtual location data corresponding to a feature of a computer animated character in a virtual environment. The computer executable components can further comprise a virtual motion sensor component that, based on the virtual location data, can generate virtual motion sensor data.

According to another embodiment, a computer-implemented method can comprise tracking, by a system operatively coupled to a processor, virtual location data corresponding to a feature of a computer animated character in a virtual environment. The computer-implemented method can further comprise, based on the virtual location data, generating, by the system, virtual motion sensor data.

According to yet another embodiment, a computer program product that can facilitate a virtual generation of motion sensor data process is provided. The computer program product can comprise a computer readable storage medium having program instructions embodied therewith, the program instructions can be executable by a processing component to cause the processing component to track, by the processor, virtual location data corresponding to a feature of a computer animated character in a virtual environment. The program instructions can further cause the processing component to, based on the virtual location data, generate, by the processor, virtual motion sensor data.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
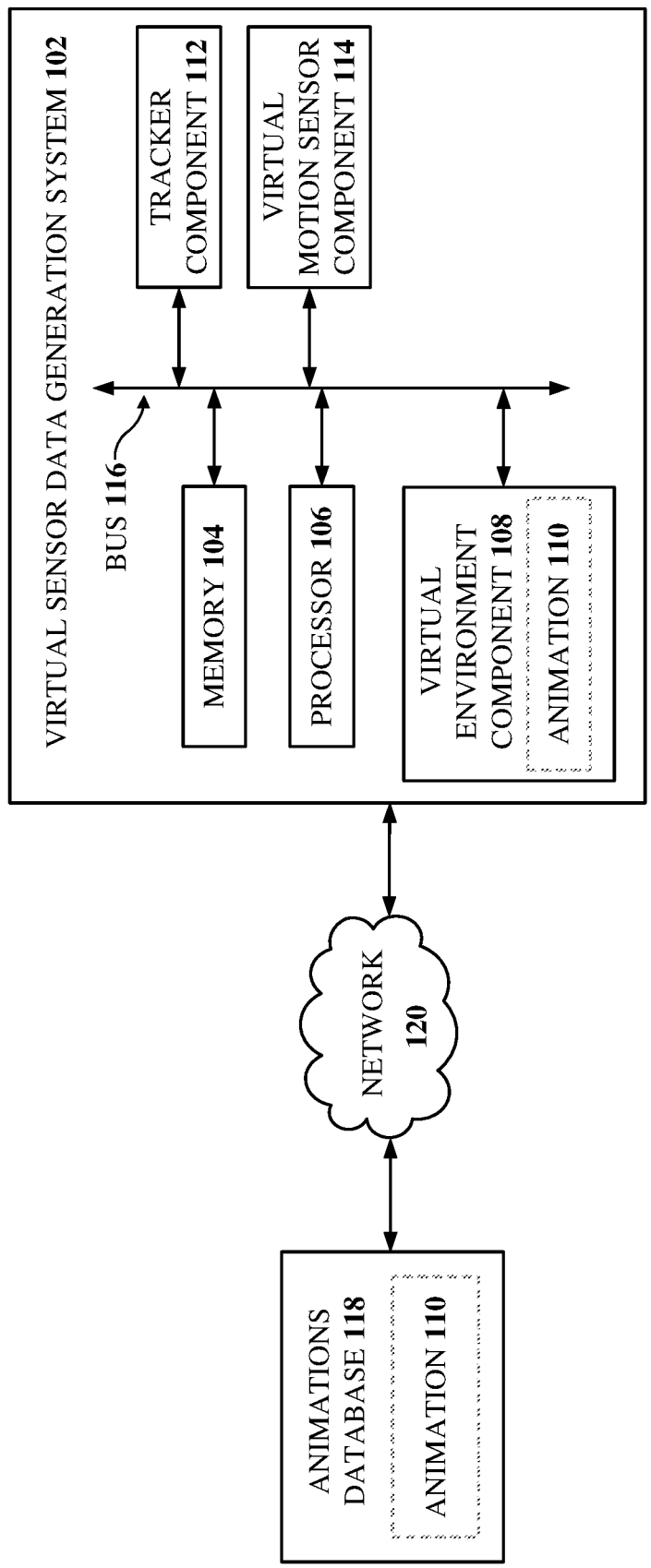
FIG. 1 illustrates a block diagram of an example, non-limiting system that facilitates virtual motion sensor data generation components in accordance with one or more embodiments described herein.

FIG. 1 illustrates a block diagram of an example, non-limiting system 100 that facilitates virtual motion sensor data generation components in accordance with one or more embodiments described herein. According to several embodiments, system 100 can comprise a virtual sensor data generation system 102. In some embodiments, virtual sensor data generation system 102 can comprise a memory 104, a processor 106, a virtual environment component 108, a tracker component 112, a virtual motion sensor component 114, and/or a bus 116. In some embodiments, virtual environment component 108 can comprise one or more animations 110. According to some embodiments, virtual sensor data generation system 102 can be in communication with one or more animations databases 118 via a network 120. In several embodiments, animations database 118 can comprise one or more animations 110.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, virtual sensor data generation system 102, and/or animations database 118 can further comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 1 or other figures disclosed herein.

According to several embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to virtual sensor data generation system 102, virtual environment component 108, animation 110, tracker component 112, virtual motion sensor component 114, and/or animations database 118.

In several embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to some embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor.

In some embodiments, virtual sensor data generation system 102, memory 104, processor 106, virtual environment component 108, tracker component 112, and/or virtual motion sensor component 114 can be communicatively, electrically, and/or operatively coupled to one another via a bus 116 to perform functions of system 100, virtual sensor data generation system 102, and/or any components coupled therewith. In several embodiments, bus 116 can comprise one or more memory bus, memory controller, peripheral bus, external bus, local bus, and/or another type of bus that can employ various bus architectures. Further examples of bus 116 are described below with reference to system bus 1018 and FIG. 10. Such examples of bus 116 can be employed to implement any embodiments of the subject disclosure.

In several embodiments, virtual sensor data generation system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with virtual sensor data generation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, virtual environment component 108, tracker component 112, virtual motion sensor component 114, and/or any other components associated with virtual sensor data generation system 102 (e.g., communicatively, electronically, and/or operatively coupled with and/or employed by virtual sensor data generation system 102), can comprise such computer and/or machine readable, writable, and/or executable component(s) and/or instruction(s). Consequently, according to numerous embodiments, virtual sensor data generation system 102 and/or any components associated therewith, can employ processor 106 to execute such computer and/or machine readable, writable, and/or executable component(s) and/or instruction(s) to facilitate performance of one or more operations described herein with reference to virtual sensor data generation system 102 and/or any such components associated therewith.

According to multiple embodiments, virtual sensor data generation system 102 can facilitate performance of operations related to and/or executed by virtual environment component 108, animation 110, tracker component 112, virtual motion sensor component 114, and/or animations database 118. For example, as described in detail below, virtual sensor data generation system 102 can facilitate: tracking (e.g., via tracker component 112) virtual location data corresponding to a feature of a computer animated character (e.g., a feature of an animation 110) in a virtual environment (e.g., virtual environment component 108); and/or based on the virtual location data, generate virtual motion sensor data (e.g., linear velocity, angular velocity, linear acceleration, angular acceleration, etc.) corresponding to such feature of a computer animated character.

In several embodiments, virtual environment component 108 can generate a one-dimensional (1D) and/or multidimensional (e.g., two-dimensional (2D), three-dimensional (3D), etc.) virtual environment that can comprise one or more digitally generated objects. For example, virtual environment component 108 can generate a 3D virtual environment comprising one or more computer-generated objects. In some embodiments, virtual environment component 108 can generate a virtual environment in which the virtual environment component 108 can animate one or more computer-generated objects (e.g., computer animated characters, such as an avatar, a humanoid, etc.). For example, virtual environment component 108 can generate a 3D virtual environment comprising a computer animated character (e.g., an avatar, a humanoid, etc.) and can further animate (i.e., impart motion to) such computer animated character in such 3D virtual environment.

In some embodiments, virtual environment component 108 can generate one or more computer-generated objects (e.g., computer animated characters, such as an avatar, a humanoid, etc.) in a virtual environment. For example, virtual environment component 108 can generate a computer animated character and can further animate such character in a 3D virtual environment generated by virtual environment component 108.

In several embodiments, virtual environment component 108 can animate one or more pre-existing computer-generated objects (e.g., computer animated characters, such as an avatar, a humanoid, etc.) in a virtual environment. For example, virtual environment component 108 can import a pre-existing computer animated character into a 3D virtual environment (e.g., a 3D virtual environment generated by virtual environment component 108) and can further animate (i.e., impart motion to) such pre-existing character in such 3D virtual environment. In some embodiments, virtual environment component 108 can import into a virtual environment one or more pre-existing computer-generated objects stored on a local storage component and/or a remote storage component. For instance, virtual environment component 108 can import into a 3D virtual environment one or more pre-existing computer-generated objects stored on memory 104.

According to several embodiments, animation 110 can comprise one or more one-dimensional (1D) and/or multi-dimensional (e.g., 2D, 3D, etc.) digitally generated objects. For example, animation 110 can comprise computer-generated objects including, but not limited to, computer animated characters, computer animations, digital animations, electronic animations, and/or other animations. In some embodiments, animation 110 can comprise one or more one-dimensional (1D) and/or multidimensional (e.g., 2D, 3D, etc.) digitally recorded objects. For example, animation 110 can comprise digitally recorded objects including, but not limited to, digital videos, electronic videos, and/or other videos. In some embodiments, animation 110 can comprise analog animations and/or analog videos.

In several embodiments, animation 110 can be formatted in a computer and/or machine readable, writable, and/or executable format and/or a human readable format. For example, animation 110 can be formatted as one or more animation and/or video files including, but not limited to, animated Graphics Interchange Format (GIF), Multi-image Network Graphics, Animated Portable Network Graphics (APNG), Small Web Format (SWF), GL Transmission Format (glTF), Scalable Vector Graphics (SVG), Advanced Video Codec High Definition (AVCHD), Audio Video Interlaced (AVI), Flash Video Format (FLV), Motion Picture Experts Group (MPEG), and/or another animation or video file.

In FIG. 1, animation 110 is depicted with dashed lines to indicate that, according to some embodiments, animation 110 can be collected by virtual sensor data generation system 102 (e.g., via network 120). According to numerous embodiments, virtual sensor data generation system 102 can collect (e.g., via read/write commands) one or more animations 110 from one or more animations databases 118. For example, virtual sensor data generation system 102 can collect from animations database 118 one or more animations 110 formatted as animation and/or video files (e.g., APNG, SWF, glTF, SVG, AVI, FLV, MPEG, etc.). In several embodiments, virtual environment component 108 can animate one or more animations 110 collected by virtual sensor data generation system 102. For example, virtual environment component 108 can animate an animation 110 comprising a computer-generated object and/or a computer animated character (e.g., an avatar, a humanoid, etc.) collected by virtual sensor data generation system 102. In several embodiments, virtual environment component 108 can animate one or more animations 110 received by virtual sensor data generation system 102. For example, virtual environment component 108 can animate an animation 110 comprising a computer-generated object and/or a computer animated character (e.g., an avatar, a humanoid, etc.) received by virtual sensor data generation system 102 over network 120 from another entity (e.g., animations database 118, a remote computing device, etc.).

In several embodiments, virtual sensor data generation system 102 and/or virtual environment component 108 can facilitate storing one or more animations 110. For example, virtual environment component 108 can facilitate storing animations 110 on a local storage component (e.g., memory 104) and/or a remote storage component. For instance, virtual environment component 108 can employ memory 104 to store animations 110 formatted as animation and/or video files (e.g., APNG, SWF, glTF, SVG, AVI, FLV, MPEG, etc.).

According to several embodiments, tracker component 112 can track virtual location data corresponding to a feature of a computer animated character in a virtual environment. For example, tracker component 112 can track virtual location data (e.g., position data, rotation data, etc.) corresponding to a feature defined on a computer animated character as such character, and feature, move over time in a virtual environment (e.g., a 3D virtual environment). For instance, tracker component 112 can track position data and/or rotation data corresponding to a feature defined on an avatar and/or a humanoid that is animated in a 3D virtual environment (e.g., animated by virtual environment component 108 in a 3D virtual environment generated by virtual environment component 108).

In some embodiments, tracker component 112 can track one or more features of a computer animated character including, but not limited to, a point, a vector, a virtual sensor, and/or another feature that can be defined on a computer animated character in a virtual environment. For example, tracker component 112 can track a point, a vector, a virtual sensor, and/or another feature defined at a certain location (e.g., a wrist, an elbow, a knee, etc.) on a computer animated character (e.g., an avatar, a humanoid, etc.). For instance, tracker component 112 can track a 3D vector having a position and orientation defined in relation to an avatar simulated in a 3D virtual environment. In such an example, the 3D vector can be defined at a position located a certain distance (e.g., 1 centimeter (cm), 2 centimeters (cm), etc.) above the left wrist of the avatar (e.g., toward the elbow of the avatar), with an orientation defined such that the Y-axis is oriented toward the left hand of the avatar and the X-axis is perpendicular to the top of the wrist of the avatar.

In several embodiments, tracker component 112 can track a feature defined on a computer animated character globally, that is, with respect to a global space in which the computer animated character is animated. For example, tracker component 112 can track position data and/or rotation data of such a feature as it relates to a coordinate system having a point of origin defined in a 3D space (e.g., a 3D virtual environment generated by virtual environment component 108). In some embodiments, tracker component 112 can track a feature defined on a computer animated character locally, that is, with respect to the computer animated character itself. For instance, tracker component 112 can track position data and/or rotation data of such a feature as it relates to a coordinate system having a point of origin defined on the computer animated character itself.

In some embodiments, tracker component 112 can track virtual location data of a feature defined on a computer animated character utilizing an arbitrary sampling rate. For example, tracker component 112 can track such a feature by sampling the position and/or rotation of the feature multiple times per second. In another example, tracker component 112 can track such a feature by sampling the position and/or rotation of the feature at certain defined time intervals. For instance, tracker component 112 can sample position data and/or rotation data of such a feature every second, every two (2) seconds, every five (5) seconds, and/or another interval of time. In another example, tracker component 112 can track virtual location data of a feature defined on a computer animated character utilizing linear interpolation of position data and/or rotation data corresponding to the feature that have been sampled over time.

In several embodiments, virtual sensor data generation system 102, virtual environment component 108, and/or tracker component 112 can facilitate storing virtual location data (e.g., position data and/or rotation data) corresponding to a feature of a computer animated character that have been sampled over time. For example, tracker component 112 can facilitate storing such position data and/or rotation data on a local storage component (e.g., memory 104) and/or a remote storage component. For instance, tracker component 112 can employ memory 104 to store such position data and/or rotation data as one or more text files (e.g., plain text file, formatted text file, etc.).

According to some embodiments, virtual motion sensor component 114 can generate virtual motion sensor data based on virtual location data sampled over time by tracker component 112. For example, virtual motion sensor component 114 can generate virtual motion sensor data corresponding to a feature of a computer animated character based on position data and/or rotation data corresponding to such feature that have been sampled over time by tracker component 112 (e.g., as described above).

In several embodiments, virtual motion sensor component 114 can generate virtual motion sensor data that simulates motion sensor data that can be captured in the physical world using a motion sensor. For instance, virtual motion sensor component 114 can generate virtual motion sensor data that simulates motion sensor data that can be captured in the physical world by utilizing a motion sensor comprising a 3-axes accelerometer, a 3-axes gyroscope, and/or a 3-axes magnetometer. For instance, virtual motion sensor component 114 can generate virtual motion sensor data that simulates motion sensor data that can be captured in the physical world including, but not limited to, linear velocity, linear acceleration, angular velocity, angular acceleration, and/or other motion sensor data that can be captured in the physical world using a motion sensor. In some embodiments, virtual motion sensor component 114 can generate virtual motion sensor data that simulates motion data that can be captured in the physical world using various motion capture techniques. For instance, virtual motion sensor component 114 can generate virtual motion sensor data that simulates motion data that can be captured in the physical world including, but not limited to, linear velocity, linear acceleration, angular velocity, angular acceleration, and/or other motion data that can be captured in the physical world using various motion capture techniques.

In some embodiments, virtual motion sensor component 114 can generate virtual motion sensor data by integrating position data and/or rotation data corresponding to a feature of a computer animated character that has been sampled/recorded by tracker component 112 over time. For example, virtual motion sensor component 114 can generate virtual motion sensor data by determining the double integral of such sampled position data and/or rotation data. In some embodiments, virtual motion sensor component 114 can generate virtual motion sensor data by determining a derivative of position data and/or rotation data corresponding to a feature of a computer animated character that has been sampled/recorded by tracker component 112 over time. For example, virtual motion sensor component 114 can generate virtual motion sensor data by determining a second derivative of such sampled position data and/or rotation data.

In several embodiments, virtual sensor data generation system 102 and/or virtual motion sensor component 114 can facilitate storing virtual motion sensor data that can be generated by virtual motion sensor component 114. For example, virtual motion sensor component 114 can facilitate storing such virtual motion sensor data on a local storage component (e.g., memory 104) and/or a remote storage component. For instance, virtual motion sensor component 114 can employ memory 104 to store such virtual motion sensor data as one or more text files (e.g., plain text file, formatted text file, etc.).

According to several embodiments, animations database 118 can comprise one or more databases comprising one or more pre-existing animations, fragments of such animations, and/or renderings of digital characters simulating various movements. For example, animations database 118 can comprise a database comprising pre-existing computer-generated objects and/or computer animated characters that can simulate various movement activities of an entity (e.g., a human) when animated in a virtual environment. For instance, animations database 118 can comprise computer-generated objects and/or computer animated characters (e.g., avatar characters, humanoid characters, etc.) that can simulate various human movement activities including, but not limited to walking, running, jumping, and/or other movement activities. In several embodiments, animations database 118 can comprise a database stored on a remote storage component. For example, animations database 118 can comprise a database stored on a server computer, a server memory component, and/or another remote storage component.

In some embodiments, animations database 118 can comprise pre-existing animations 110. For example, animations database 118 can comprise pre-existing animations 110 (e.g., computer-generated objects and/or computer animated characters, such as avatar characters, humanoid characters, etc.) that have been generated via animations database 118. In an embodiment, animations database 118 can comprise pre-existing animations 110 that have been generated via motion capture techniques. In several embodiments, animations database 118 can comprise pre-existing animations 110 that have been stored on animations database 118 as animation and/or video files (e.g., APNG, SWF, glTF, SVG, AVI, FLV, MPEG, etc.).

In some embodiments, animations database 118 can comprise pre-existing computer-generated objects and/or computer animated characters (e.g., avatar characters, humanoid characters, etc.) that correspond to one or more ground truth labels. For example, animations database 118 can comprise one or more pre-existing animations 110 that correspond to one or more ground truth labels (e.g., walking, running, jumping, etc.). For instance, animations database 118 can comprise pre-existing animations 110 that have been generated using motion capture techniques (e.g., digitally recording the movements of an entity in the physical world) and labeled with one or more ground truth labels. In some embodiments, such one or more ground truth labels can describe the type of movement activity an entity performs in the physical world (e.g., walking, running, jumping, etc.) that has been recorded using motion capture techniques. In some embodiments, such one or more ground truth labels can describe the type of movement activity such pre-existing animations 110 can simulate when animated in a virtual environment (e.g., an avatar walking in a 3D virtual environment).

In some embodiments, the contents of animations database 118 can be accessed for various purposes. For example, virtual sensor data generation system 102 and/or any components associated therewith (e.g., virtual environment component 108) can access (e.g., via network 120) the contents of animations database 118 (e.g., pre-existing computer-generated objects and/or computer animated characters). In some embodiments, the contents of animations database 118 can be queried. For example, virtual sensor data generation system 102 and/or any components associated therewith can query the contents of animations database 118 to locate one or more pre-existing animations 110 corresponding to a certain ground truth label (e.g., pre-existing computer-generated objects and/or computer animated characters that can simulate a human walking in a virtual environment). In some embodiments, the contents of animations database 118 can be collected. For example, virtual sensor data generation system 102 and/or any components associated therewith can collect the contents of animations database 118 (e.g., one or more pre-existing animations 110 corresponding to a certain ground truth label).

According to some embodiments, network 120 can include one or more wired and/or wireless networks, including, but not limited to, a cellular network, a wide area network (WAN) (e.g., the Internet) or a local area network (LAN). For example, network 120 can comprise wired or wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, virtual sensor data generation system 102 can thus include hardware (e.g., central processing unit (CPU), transceiver, decoder, etc.), software (e.g., set of threads, set of processes, software in execution, etc.) or a combination of hardware and software that facilitates communicating information between virtual sensor data generation system 102 and external systems, sources, and/or devices.

Although the subject disclosure is mostly described herein with reference to animations 110 comprising computer-generated objects and/or computer animated characters, it should be appreciated that the various systems, devices, components, and/or processes of the subject disclosure are not so limited. For example, as described above, animation 110 can comprise one or more digitally recorded objects (e.g., a digital video of a human moving in the physical world). In such an example, virtual sensor data generation system 102, and/or components associated therewith (e.g., tracker component 112, virtual motion sensor component 114, etc.), can execute the same or similar functions described herein with reference to virtual sensor data generation system 102 and/or such components associated therewith. For instance, in an embodiment, animation 110 can comprise a digital recording of an object (e.g., a human) moving in the physical world. In such an embodiment, tracker component 112 can track (e.g., as described above) virtual location data (e.g., position data, rotation data, etc.) corresponding to a feature defined on the object in the digital recording as such object, and feature, move over time in the digital recording. In this example, virtual motion sensor component 114 can generate (e.g., as described above) virtual motion sensor data corresponding to such feature based on position data and/or rotation data corresponding to the feature that have been sampled over time by tracker component 112 (e.g., as described above).

Figure 2:
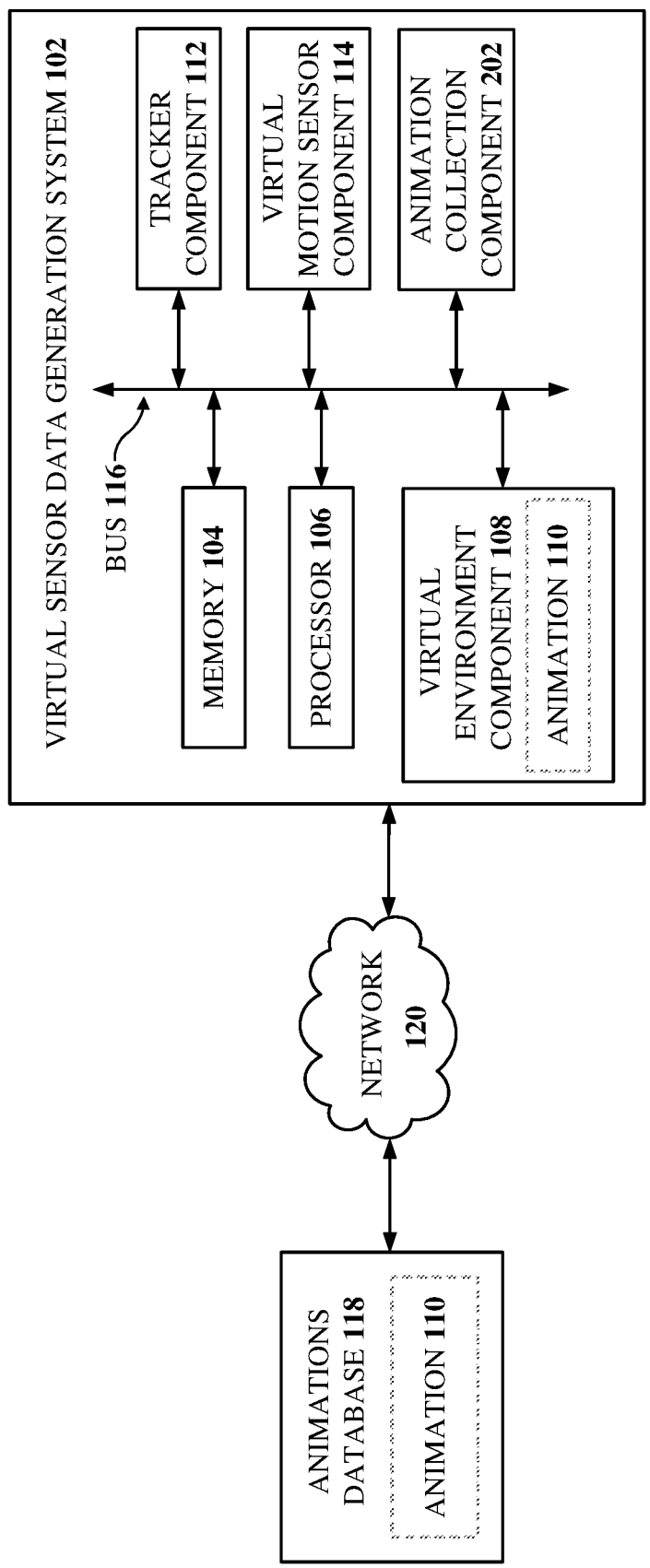
FIG. 2 illustrates a block diagram of an example, non-limiting system that facilitates virtual motion sensor data generation components in accordance with one or more embodiments described herein.

FIG. 2 illustrates a block diagram of an example, non-limiting system 200 that facilitates virtual motion sensor data generation components in accordance with one or more embodiments described herein. Repetitive description of like elements employed in respective embodiments is omitted for sake of brevity. According to several embodiments, system 200 can comprise virtual sensor data generation system 102. In some embodiments, virtual sensor data generation system 102 can comprise an animation collection component 202.

According to several embodiments, animation collection component 202 can collect desired animation movements from pre-existing humanoid computer animations. For example, animation collection component 202 can access (e.g., via network 120) the contents of animations database 118. In this example, animation collection component 202 can query animations database 118 to locate pre-existing animations 110 that can simulate desired animation movements (e.g., walking, running, jumping, etc.) when simulated in a virtual environment (e.g., a 3D virtual environment). In such example, animation collection component 202 can further collect such pre-existing animations 110 from animations database 118. In some embodiments, animation collection component 202 can facilitate storing one or more collected animations 110. For example, animation collection component 202 can facilitate storing such collected animations 110 on a local storage component (e.g., memory 104) and/or a remote storage component. For instance, animation collection component 202 can employ memory 104 to store animations 110 formatted as animation and/or video files (e.g., APNG, SWF, glTF, SVG, AVI, FLV, MPEG, etc.).

In some embodiments, virtual sensor data generation system 102 and/or animation collection component 202 can separate one or more collected animations 110. For example, animation collection component 202 can separate animations 110 collected by animation collection component 202 into animations that can simulate desired animation movements (e.g., walking, running, jumping, etc.) and animations that cannot simulate such desired animation movements. For instance, animation collection component 202 can facilitate such separation of animations 110 stored on memory 104 (e.g., animations 110 that have been collected by animation collection component 202 and stored on memory 104, as described above). In this example, animation collection component 202 can employ memory 104 to store such separated animations 110 as animation and/or video files (e.g., APNG, SWF, glTF, SVG, AVI, FLV, MPEG, etc.).

In several embodiments, virtual sensor data generation system 102 and/or animation collection component 202 can designate one or more labels corresponding to one or more animations 110. For example, animation collection component 202 can designate one or more labels corresponding to respective separated animations 110 based on whether, or not, such animations 110 can simulate desired animation movements (e.g., walking, running, jumping, etc.). For instance, animation collection component 202 can designate a "positive label" corresponding to respective separated animations 110 that can simulate such desired animation movements and can further designate a "negative label" corresponding to respective separated animations 110 that cannot simulate such desired animation movements. In some embodiments, animation collection component 202 can designate one or more labels corresponding to respective animations 110 stored on memory 104. For example, animation collection component 202 can designate one or more labels corresponding to respective animations 110 that have been collected, separated, and stored by animation collection component 202 on memory 104 (e.g., as described above). In this example, animation collection component 202 can employ memory 104 to store such designated animations 110 as animation and/or video files (e.g., APNG, SWF, glTF, SVG, AVI, FLV, MPEG, etc.).

Figure 3:
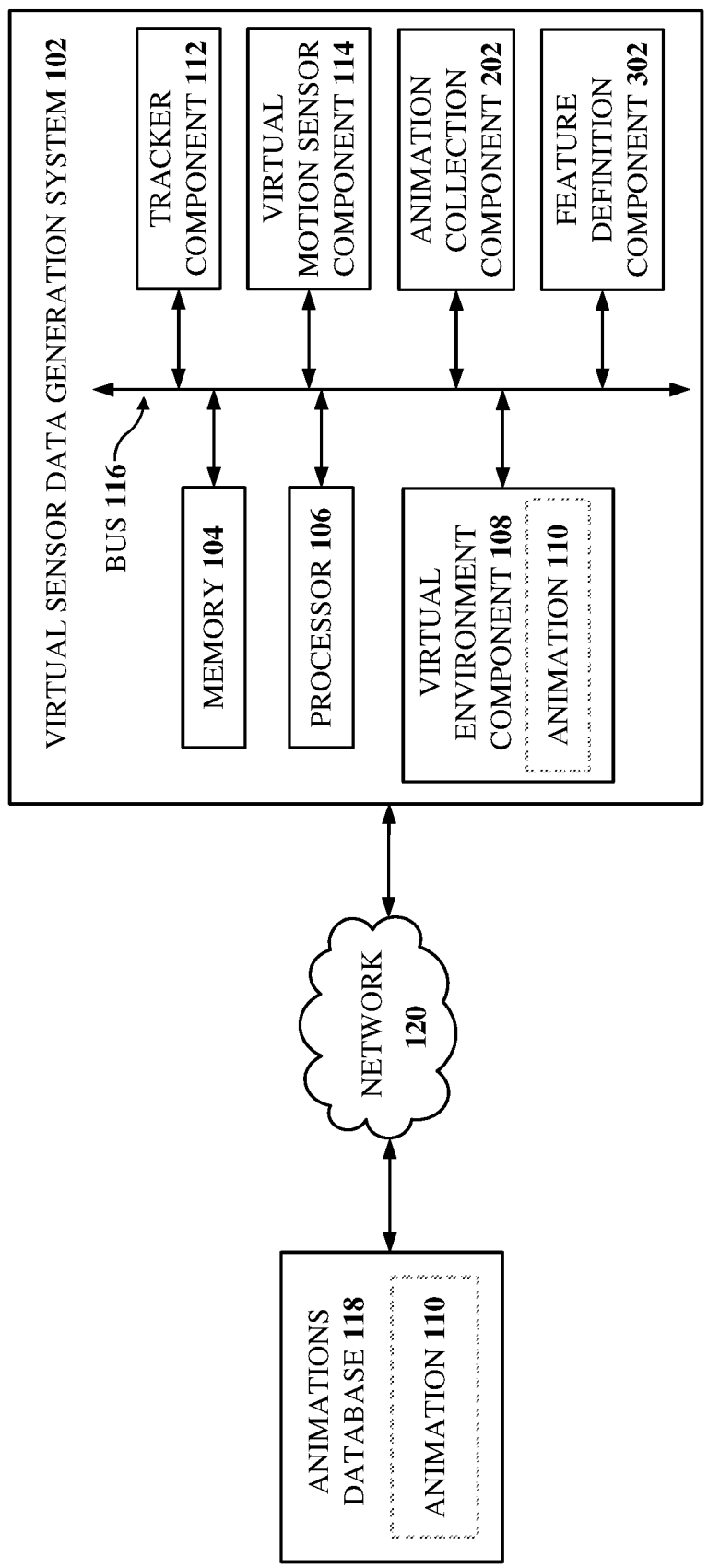
FIG. 3 illustrates a block diagram of an example, non-limiting system that facilitates virtual motion sensor data generation components in accordance with one or more embodiments described herein.

FIG. 3 illustrates a block diagram of an example, non-limiting system 300 that facilitates virtual motion sensor data generation components in accordance with one or more embodiments described herein. Repetitive description of like elements employed in respective embodiments is omitted for sake of brevity. According to several embodiments, system 300 can comprise virtual sensor data generation system 102. In some embodiments, virtual sensor data generation system 102 can comprise a feature definition component 302.

According to several embodiments, feature definition component 302 can define a feature on a computer animated character (e.g., a feature that can be tracked by tracker component 112). For instance, feature definition component 302 can define a feature, such as, for example, a point, a vector, a virtual sensor, and/or another feature on a computer animated character, that can be tracked by tracker component 112 (e.g., as described above with reference to tracker component 112 and FIG. 1). For example, feature definition component 302 can define a feature (e.g., a point, a vector, a virtual sensor, etc.) on a computer animated character by defining a position and/or an orientation of such a feature on a computer animated character.

In some embodiments, feature definition component 302 can define a position and/or an orientation of a feature on a computer animated character globally, that is, with respect to a global space in which the computer animated character can be animated (e.g., a 3D virtual environment). For example, feature definition component 302 can define a position and/or an orientation of a feature on a computer animated character with respect to a coordinate system having a point of origin defined in a 3D space (e.g., a 3D virtual environment generated by virtual environment component 108).

In several embodiments, feature definition component 302 can define a position and/or an orientation of a feature on a computer animated character locally, that is, with respect to the computer animated character itself. For instance, feature definition component 302 can define a position and/or an orientation of a feature on a computer animated character with respect to a coordinate system having a point of origin defined on the computer animated character itself.

In some embodiments, feature definition component 302 can define a feature comprising a virtual sensor at a location of interest on a computer animated character (e.g., an avatar, a humanoid, etc.). For example, feature definition component 302 can define a 3D vector representing a virtual sensor that can be positioned at a certain distance (e.g., 1 cm, 2 cm, etc.) above a left wrist of a computer animated avatar character (e.g., toward the elbow of the avatar). In this example, feature definition component 302 can further define an orientation of the 3D vector such that the Y-axis is oriented toward the left hand of the avatar and the X-axis is perpendicular to the top of the wrist of the avatar.

Figure 4:
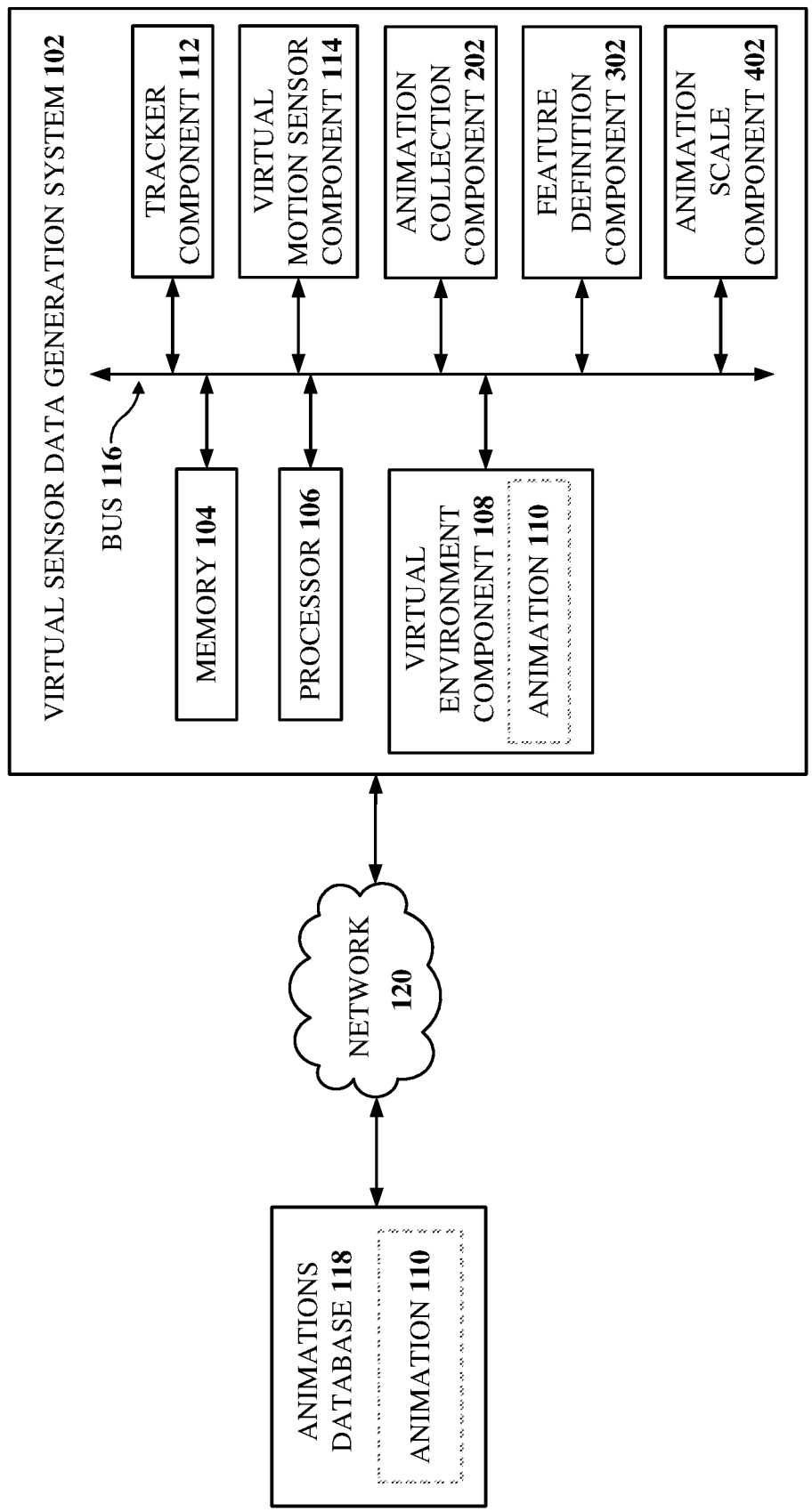
FIG. 4 illustrates a block diagram of an example, non-limiting system that facilitates virtual motion sensor data generation components in accordance with one or more embodiments described herein.

FIG. 4 illustrates a block diagram of an example, non-limiting system 400 that facilitates virtual motion sensor data generation components in accordance with one or more embodiments described herein. Repetitive description of like elements employed in respective embodiments is omitted for sake of brevity. According to several embodiments, system 400 can comprise virtual sensor data generation system 102. In some embodiments, virtual sensor data generation system 102 can comprise an animation scale component 402.

According to several embodiments, animation scale component 402 can scale one or more dimensions of animation 110. For example, animation scale component 402 can scale one or more dimensions of animation 110 relative to one or more other computer-generated objects and/or computer animated characters in a virtual environment (e.g., a 3D virtual environment generated by virtual environment component 108). For instance, animation scale component 402 can scale dimensions of animation 110 relative to a computer-generated object and/or computer animated character having known and/or fixed dimensions in virtual environment. In this example, such computer-generated object and/or computer animated character having known and/or fixed dimensions can include, but is not limited to, a sidewalk (e.g., with a fixed width of 3 feet (ft) in a virtual environment), a fence (e.g., with a fixed height of 8 ft in a virtual environment), and/or another object in a virtual environment.

In some embodiments, animation scale component 402 can scale one or more dimensions of animation 110 (e.g., as described above) to facilitate improved accuracy of virtual motion sensor data generated by virtual motion sensor component 114 (e.g., as described above with reference to virtual motion sensor component 114 and FIG. 1). For example, animation scale component 402 can scale one or more dimensions of animation 110 to facilitate improved accuracy of such virtual motion sensor data including, but not limited to, linear velocity, linear acceleration, angular velocity, angular acceleration, and/or other virtual motion sensor data that can be generated by virtual motion sensor component 114.

Figure 5:
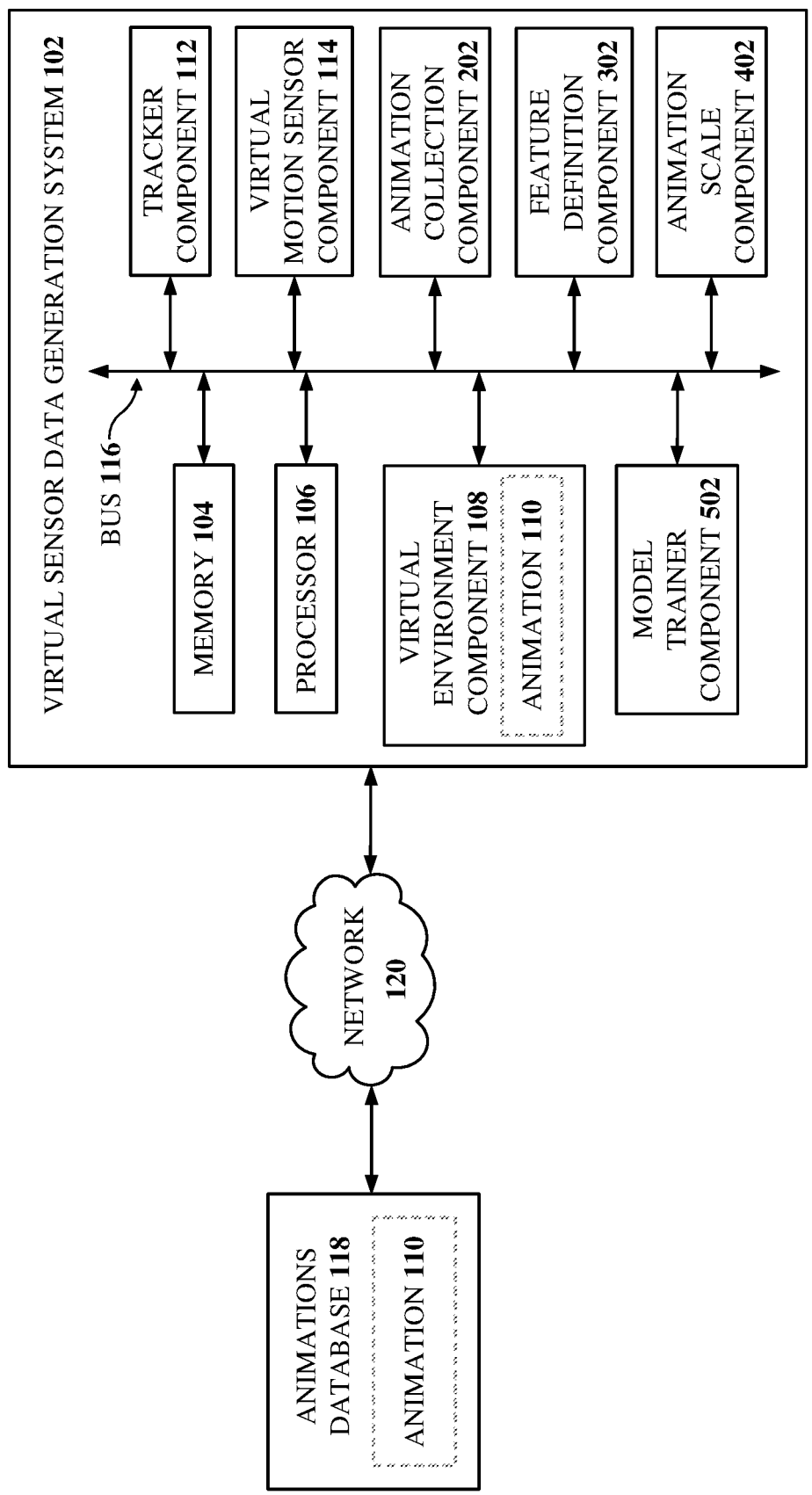
FIG. 5 illustrates a block diagram of an example, non-limiting system that facilitates virtual motion sensor data generation components in accordance with one or more embodiments described herein.

FIG. 5 illustrates a block diagram of an example, non-limiting system 500 that facilitates virtual motion sensor data generation components in accordance with one or more embodiments described herein. Repetitive description of like elements employed in respective embodiments is omitted for sake of brevity. According to several embodiments, system 500 can comprise virtual sensor data generation system 102. In some embodiments, virtual sensor data generation system 102 can comprise a model trainer component 502.

According to several embodiments, model trainer component 502 can train a predictive model to identify one or more movement activities of an entity based on virtual motion sensor data. For example, by inputting to a predictive model the virtual motion sensor data generated by virtual motion sensor component 114 (e.g., as described above with reference to virtual motion sensor component 114 and FIG. 1), model trainer component 502 can train such a predictive model (e.g., a machine learning model, a machine learning algorithm, a neural network, etc.) to identify a human performing various movement activities (e.g., walking, running, jumping, etc.).

In an embodiment, model trainer component 502 can train a predictive model, such as, for example, a machine learning model to identify an entity walking by inputting to such model the virtual motion sensor data generated from a virtual sensor defined on a wrist of an avatar walking in a virtual environment. In such embodiment, model trainer component 502 can train the machine learning model to compare the virtual motion sensor data to, for example, ground truth motion sensor data collected from a motion sensor located on a wrist of a human walking in the physical world. In this embodiment, model trainer component 502 can train the machine learning model to identify ground truth motion sensor data that matches the virtual motion sensor data, thereby training the model to identify a human walking based on the virtual motion sensor data. For instance, model trainer component 502 can train the machine learning model to identify ground truth motion sensor data that is the same as the virtual motion sensor data, thereby training the model to identify a human walking based on the virtual motion sensor data.

In several embodiments, model trainer component 502 can input to a predictive model a plurality of animations 110 having "positive" ground truth labels (e.g., animations 110 comprising movement activities of an entity that the predictive model will be trained to identify, such as a human walking, running, jumping, etc.). For instance, model trainer component 502 can input to a predictive model, such as, for example, a machine learning model a plurality of animations 110 stored on memory 104 that have "positive" ground truth labels. In this example, such animations 110 can comprise an avatar walking with a virtual sensor defined on a wrist of the avatar and the respective avatars can walk with a style that differs from that of the avatars of the other animations 110. In such an example, model trainer component 502 can further input to the machine learning model the virtual motion sensor data corresponding to the respective virtual sensors, thereby populating the model with a variety of virtual sensor data corresponding to different walking styles of an avatar. Continuing with this example, model trainer component 502 can train the machine learning model to compare such virtual motion sensor data corresponding to the virtual sensors on the respective avatars to, for example, ground truth motion sensor data collected from a motion sensor located on a wrist of a human walking in the physical world. In such an example, model trainer component 502 can train the machine learning model to identify ground truth motion sensor data that matches the virtual motion sensor data, thereby training the model to identify a human walking based on the virtual motion sensor data.

In some embodiments, model trainer component 502 can train a predictive model to infer one or more movement activities of an entity based on virtual motion sensor data. For instance, model trainer component 502 can train a machine learning model to identify ground truth motion sensor data that is within a certain range of acceptable variation from the virtual motion sensor data, thereby training the machine learning model to infer a human walking based on the virtual motion sensor data.

In some embodiments, model trainer component 502 can employ principles of machine learning and/or artificial intelligence to train a predictive model (e.g., a machine learning model, a machine learning algorithm, a neural network, etc.) to identify one or more movement activities of an entity based on virtual motion sensor data. For instance, model trainer component 502 can train a predictive model based on, for example, classifications, correlations, inferences, and/or expressions associated with principles of machine learning and/or artificial intelligence. For example, model trainer component 502 can employ an automatic classification system and/or an automatic classification process to train such a predictive model. In one embodiment, model trainer component 502 can employ a probabilistic and/or statistical-based analysis (e.g., factoring into the analysis utilities and costs) to train a predictive model to identify (e.g., via inference-based schemes) one or more movement activities of an entity based on virtual motion sensor data.

According to some embodiments, model trainer component 502 can employ any suitable machine learning based techniques, statistical-based techniques, and/or probabilistic-based techniques. For example, model trainer component 502 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In some embodiments, model trainer component 502 can train a predictive model to perform a set of machine learning computations associated with identifying one or more movement activities of an entity based on virtual motion sensor data. For example, model trainer component 502 can train a predictive model to perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to identify one or more movement activities of an entity based on virtual motion sensor data.

In some embodiments, model trainer component 502 can train a predictive model to apply a certain degree of random variation the virtual motion sensor data and/or ground truth motion sensor data to infer one or more movement activities of an entity based on the virtual motion sensor data. In some embodiments, model trainer component 502 can train a predictive model to dynamically alter and/or control an amount of random variation to the virtual motion sensor data and/or the ground truth motion sensor data. For example, model trainer component 502 can train a predictive model to alter a parameter of the virtual motion sensor data and/or the ground truth motion sensor data, such as, for example, linear velocity, linear acceleration, angular velocity, angular acceleration, and/or another parameter to facilitate inferring one or more movement activities of an entity based on the virtual motion sensor data.

In numerous embodiments, virtual sensor data generation system 102, and/or components associated therewith (e.g., virtual environment component 108, animation 110, tracker component 112, virtual motion sensor component 114, animation collection component 202, feature definition component 302, animation scale component 402, model trainer component 502, etc.), can be controlled by an entity (e.g., an animate entity, such as a human, for example). For instance, virtual sensor data generation system 102, and/or components associated therewith, can comprise one or more user interfaces (e.g., graphical user interface (GUI), form-based interface, natural language interface, etc.) that enable an entity (e.g., a human) to input instructions and/or commands to the virtual sensor data generation system 102, and/or components associated therewith. For instance, an entity (e.g., a human) can employ a computing device (e.g., a computer having a keyboard, mouse, and/or monitor) comprising virtual sensor data generation system 102, and/or components associated therewith, to input such instructions and/or commands to virtual sensor data generation system 102 and/or components associated therewith (e.g., via a graphical user interface (GUI)). In this example, inputting such instructions and/or commands can facilitate controlling virtual sensor data generation system 102, and/or components associated therewith.

In some embodiments, an entity (e.g., a human) can control virtual environment component 108 to modify one or more animations 110 collected from animations database 118 (e.g., via animation collection component 202). For example, an entity can modify an animation 110 from one type of animation to another. For instance, a human can modify (e.g., via virtual environment component 108) an animation 110 having only a virtual skeleton (e.g., a hierarchical set of interconnected objects defining a character in a virtual environment) to a complete virtual character comprising the virtual skeleton and a surface representation (e.g., skin and/or mesh) of the character (e.g., an avatar, a humanoid, etc.). In another embodiment, an entity can define a feature on a computer animated character that will be tracked by tracker component 112. For example, a human can define (e.g., via virtual environment component 108): the type of feature to be tracked (e.g., a point, a vector, a virtual sensor, etc.); the location/position of the feature on the computer animated character (e.g., 2 cm above the left wrist of the character); and the orientation of the feature with respect to the computer animated character (e.g., the Y-axis oriented toward the left hand of the character and the X-axis perpendicular to the top of the wrist of the character).

In some embodiments, virtual sensor data generation system 102 can be a virtual motion sensor data generation system and/or process associated with various technologies. For example, virtual sensor data generation system 102 can be associated with animation technologies, computer animation technologies, digital animation technologies, motion data capture technologies, motion data generation technologies, motion data collection technologies, motion data processing technologies, motion data analysis technologies, ground truth labeling technologies, virtual environment technologies, virtual reality technologies, video technologies, video game technologies, remote monitoring technologies, motion tracking technologies, sensor technologies, virtual sensor technologies, motion sensor technologies, machine learning technologies, artificial intelligence technologies, and/or other technologies.

In some embodiments, virtual sensor data generation system 102 can provide technical improvements to systems, devices, components, operational steps, and/or processing steps associated with the various technologies identified above. For example, virtual sensor data generation system 102 can automatically generate, in a virtual environment using a pre-existing animated character, virtual motion sensor data that is equivalent to motion sensor data captured by a motion sensor in the physical world (e.g., a motion sensor worn by a human), thereby eliminating the need for a motion data generation system and/or motion data analysis system to employ motion data capturing systems and/or motion data capturing methods (e.g., motion capture, motion sensors, etc.) to collect motion data from the physical world (e.g., motion data corresponding to an entity moving in the physical world). It should be appreciated that such elimination reduces the operational complexity of such motion data generation systems and/or motion data analysis systems by eliminating one or more system components and/or processing steps of such systems, thereby improving system performance, efficiency, and/or start-to-end operation run-time associated with such systems.

In some embodiments, virtual sensor data generation system 102 can provide technical improvements to a processing unit associated with a motion data generation system and/or motion data analysis system. For example, as described above, virtual sensor data generation system 102 eliminates the need for a motion data generation system and/or motion data analysis system to employ motion data capturing systems and/or motion data capturing methods (e.g., motion capture, motion sensors, etc.) to collect motion data from the physical world (e.g., motion data corresponding to an entity moving in the physical world). Consequently, it should be appreciated that such elimination reduces the operational complexity of such motion data generation systems and/or motion data analysis systems by eliminating one or more system components and/or processing steps of such systems, thereby facilitating improved processing capacity, processing performance, processing efficiency, and/or processing time associated with a processing unit of such systems (e.g., processor 106). For example, by eliminating one or more processing steps of such motion data generation systems and/or motion data analysis systems, the processing workload of a processing unit associated with such systems (e.g., processor 106) is thereby reduced, which facilitates improved processing capacity, processing performance, processing efficiency, and/or processing time associated with such processing unit (e.g., processor 106).

In some embodiments, virtual sensor data generation system 102 can generate virtual motion sensor data based on pre-existing and pre-labeled computer animated characters, which eliminates the need for a processing unit (e.g., processor 106) associated with a motion data capture system, motion data generation system, and/or a motion data analysis system to execute processing workloads associated with labeling, classifying, and/or categorizing ground truth motion sensor data collected and/or processed by such systems. In such embodiments, eliminating processing workloads associated with labeling, classifying, and/or categorizing ground truth motion sensor data can facilitate improved processing capacity, processing performance, processing efficiency, and/or processing time associated with such processing unit (e.g., processor 106).

In some embodiments, virtual sensor data generation system 102 can collect pre-existing animations (e.g., animations 110) from a remote animations database (e.g., animations database 118) rather than store such pre-existing animations on a local storage component (e.g., memory 104) associated with a motion data capture system, motion data generation system, and/or a motion data analysis system. In such embodiments, collecting pre-existing animations on an as-needed basis, rather than storing them on a local storage component (e.g., memory 104) can facilitate improved performance, efficiency, and/or available storage capacity of such local storage component (e.g., memory 104).

In some embodiments, virtual sensor data generation system 102 can employ hardware and/or software to solve problems that are highly technical in nature, that are not abstract and that cannot be performed as a set of mental acts by a human. For example, virtual sensor data generation system 102 can automatically: track virtual location data (e.g., via sampling position data and/or rotation data numerous times per second) corresponding to a feature of a computer animated character in a virtual environment (e.g., a 3D virtual environment); and/or based on the virtual location data, generate virtual motion sensor data (e.g., linear velocity, linear acceleration, angular velocity, angular acceleration, etc.). In such an example, virtual sensor data generation system 102 can further train a predictive model (e.g., a machine learning model) to identify one or more movement activities of an entity based on such virtual motion sensor data. For instance, virtual sensor data generation system 102 can train a machine learning model to identify a human walking by training such a model to compare ground truth motion sensor data corresponding to a human walking in the physical world to such virtual motion sensor data generated by virtual sensor data generation system 102.

It is to be appreciated that virtual sensor data generation system 102 can perform a virtual motion sensor data generation process utilizing various combinations of electrical components, mechanical components, and circuitry that cannot be replicated in the mind of a human or performed by a human. For example, tracking virtual location data corresponding to a feature of a computer animated character in a virtual environment and generating virtual motion sensor data based on such virtual location data are operations that are greater than the capability of a human mind. For instance, the amount of data processed, the speed of processing such data, and/or the types of data processed by virtual sensor data generation system 102 over a certain period of time can be greater, faster, and/or different than the amount, speed, and/or data type that can be processed by a human mind over the same period of time.

According to several embodiments, virtual sensor data generation system 102 can also be fully operational towards performing one or more other functions (e.g., fully powered on, fully executed, etc.) while also performing the above-referenced virtual motion sensor data generation process. It should also be appreciated that such simultaneous multi-operational execution is beyond the capability of a human mind. It should also be appreciated that virtual sensor data generation system 102 can include information that is impossible to obtain manually by an entity, such as a human user. For example, the type, amount, and/or variety of information included in virtual environment component 108, animation 110, tracker component 112, virtual motion sensor component 114, and/or animations database 118 can be more complex than information obtained manually by a human user.

Figure 6:
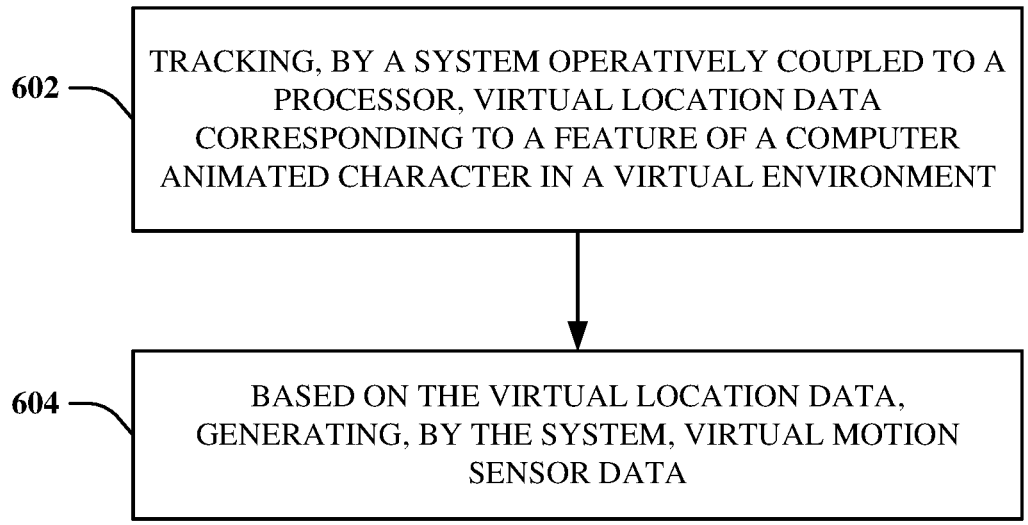
FIG. 6 illustrates a flow diagram of an example, non-limiting computer-implemented method that facilitates virtual motion sensor data generation components in accordance with one or more embodiments described herein.

FIG. 6 illustrates a flow diagram of an example, non-limiting computer-implemented method 600 that facilitates virtual motion sensor data generation components in accordance with one or more embodiments described herein. Repetitive description of like elements employed in other embodiments described herein is omitted for sake of brevity.

At 602, tracking, by a system (e.g., via virtual sensor data generation system 102 and/or tracker component 112) operatively coupled to a processor (e.g., processor 106), virtual location data corresponding to a feature of a computer animated character (e.g., animation 110) in a virtual environment (e.g., a 3D virtual environment generated, simulated, and/or rendered by virtual environment component 108). In some embodiments, virtual location data can comprise position data and/or rotation data corresponding to a feature of a computer animated character, such as, for example, a point, a vector, and/or a virtual sensor defined at a location of interest (e.g., a wrist) on an avatar and/or a humanoid in a virtual environment. In some embodiments, the computer animated character can correspond to one or more ground truth labels (e.g., walking, running, jumping, etc.).

At 604, based on the virtual location data, generating, by the system (e.g., via virtual sensor data generation system 102 and/or virtual motion sensor component 114), virtual motion sensor data. In some embodiments, the virtual motion sensor data can comprise linear velocity, linear acceleration, angular velocity, angular acceleration, and/or other virtual motion sensor data.

Figure 7:
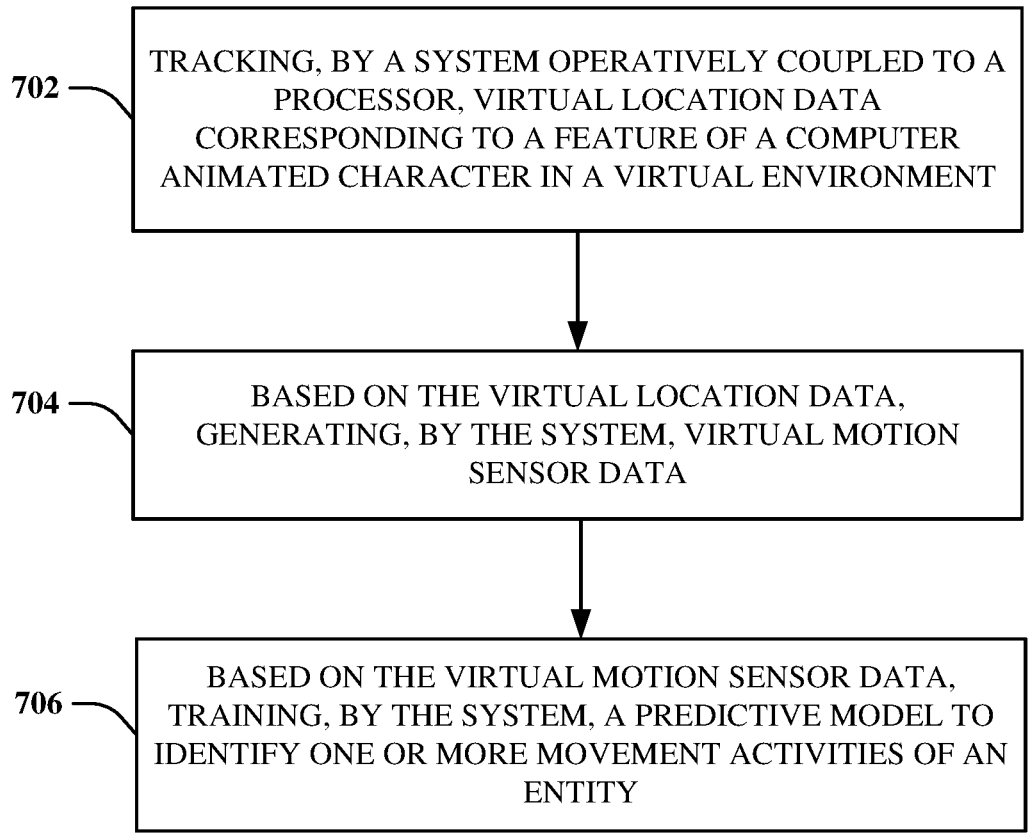
FIG. 7 illustrates a flow diagram of an example, non-limiting computer-implemented method that facilitates virtual motion sensor data generation components in accordance with one or more embodiments described herein.

FIG. 7 illustrates a flow diagram of an example, non-limiting computer-implemented method 700 that facilitates virtual motion sensor data generation components in accordance with one or more embodiments described herein. Repetitive description of like elements employed in other embodiments described herein is omitted for sake of brevity.

At 702, tracking, by a system (e.g., via virtual sensor data generation system 102 and/or tracker component 112) operatively coupled to a processor (e.g., processor 106), virtual location data corresponding to a feature of a computer animated character (e.g., animation 110) in a virtual environment (e.g., a 3D virtual environment generated, simulated, and/or rendered by virtual environment component 108). In some embodiments, virtual location data can comprise position data and/or rotation data corresponding to a feature of a computer animated character, such as, for example, a point, a vector, and/or a virtual sensor defined at a location of interest (e.g., a wrist) on an avatar and/or a humanoid in a virtual environment. In some embodiments, the computer animated character can correspond to one or more ground truth labels (e.g., walking, running, jumping, etc.).

At 704, based on the virtual location data, generating, by the system (e.g., via virtual sensor data generation system 102 and/or virtual motion sensor component 114), virtual motion sensor data. In some embodiments, the virtual motion sensor data can comprise linear velocity, linear acceleration, angular velocity, angular acceleration, and/or other virtual motion sensor data.

At 706, based on the virtual motion sensor data, training, by the system (e.g., via virtual sensor data generation system 102 and/or model trainer component 502), a predictive model to identify one or more movement activities of an entity. In some embodiments, a predictive model can comprise a machine learning model/algorithm that can identify a human walking based on virtual motion sensor data.

Figure 8:
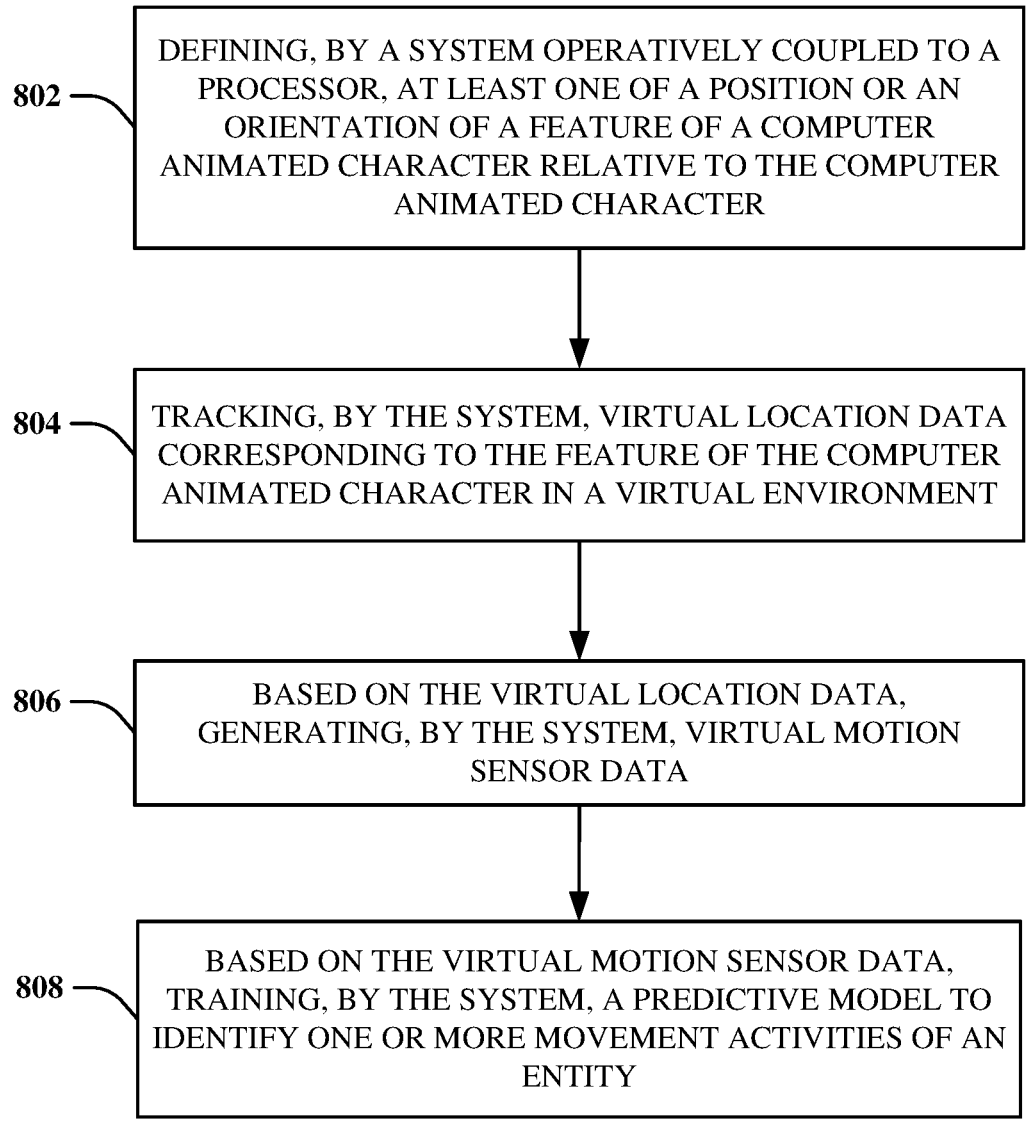
FIG. 8 illustrates a flow diagram of an example, non-limiting computer-implemented method that facilitates virtual motion sensor data generation components in accordance with one or more embodiments described herein.

FIG. 8 illustrates a flow diagram of an example, non-limiting computer-implemented method 800 that facilitates virtual motion sensor data generation components in accordance with one or more embodiments described herein. Repetitive description of like elements employed in other embodiments described herein is omitted for sake of brevity.

At 802, defining, by a system (e.g., via virtual sensor data generation system 102 and/or feature definition component 302) operatively coupled to a processor (e.g., processor 106), at least one of a position or an orientation of a feature of a computer animated character (e.g., animation 110) relative to the computer animated character. In some embodiments, defining at least one of a position or an orientation of a feature of a computer animated character can comprise defining a position and/or an orientation of, for example, a point, a vector, and/or a virtual sensor defined at a location of interest (e.g., a wrist) on an avatar and/or a humanoid in a virtual environment.

At 804, tracking, by the system (e.g., via virtual sensor data generation system 102 and/or tracker component 112), virtual location data corresponding to the feature of the computer animated character in a virtual environment (e.g., a 3D virtual environment generated, simulated, and/or rendered by virtual environment component 108). In some embodiments, virtual location data can comprise position data and/or rotation data corresponding to a feature of a computer animated character, such as, for example, a point, a vector, and/or a virtual sensor defined at a location of interest (e.g., a wrist) on an avatar and/or a humanoid in a virtual environment. In some embodiments, the computer animated character can correspond to one or more ground truth labels (e.g., walking, running, jumping, etc.).

At 806, based on the virtual location data, generating, by the system (e.g., via virtual sensor data generation system 102 and/or virtual motion sensor component 114), virtual motion sensor data. In some embodiments, the virtual motion sensor data can comprise linear velocity, linear acceleration, angular velocity, angular acceleration, and/or other virtual motion sensor data.

At 808, based on the virtual motion sensor data, training, by the system (e.g., via virtual sensor data generation system 102 and/or model trainer component 502), a predictive model to identify one or more movement activities of an entity. In some embodiments, a predictive model can comprise a machine learning model/algorithm that can identify a human walking based on virtual motion sensor data.

Figure 9:
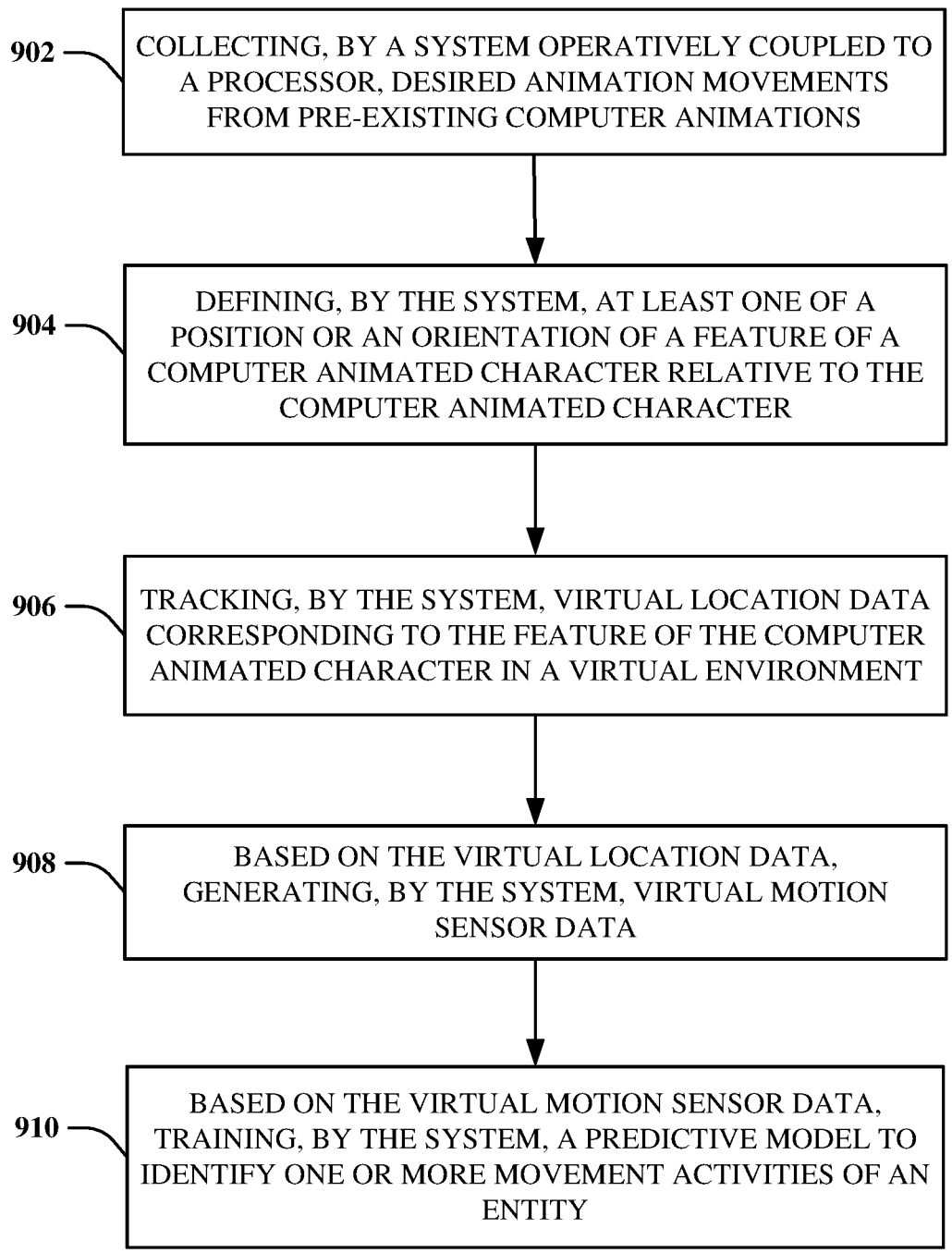
FIG. 9 illustrates a flow diagram of an example, non-limiting computer-implemented method that facilitates virtual motion sensor data generation components in accordance with one or more embodiments described herein.

FIG. 9 illustrates a flow diagram of an example, non-limiting computer-implemented method 900 that facilitates virtual motion sensor data generation components in accordance with one or more embodiments described herein. Repetitive description of like elements employed in other embodiments described herein is omitted for sake of brevity.

At 902, collecting, by a system (e.g., via virtual sensor data generation system 102 and/or animation collection component 202) operatively coupled to a processor (e.g., processor 106), desired animation movements (e.g., animation 110) from pre-existing computer animations (e.g., animations 110 stored on animations database 118). In some embodiments, collecting desired animation movements from pre-existing computer animations can comprise collecting desired animation movements from pre-existing humanoid computer animations (e.g., animations 110 stored on animations database 118).

At 904, defining, by the system (e.g., via virtual sensor data generation system 102 and/or feature definition component 302), at least one of a position or an orientation of a feature of a computer animated character (e.g., animation 110) relative to the computer animated character. In some embodiments, defining at least one of a position or an orientation of a feature of a computer animated character can comprise defining a position and/or an orientation of, for example, a point, a vector, and/or a virtual sensor defined at a location of interest (e.g., a wrist) on an avatar and/or a humanoid in a virtual environment.

At 906, tracking, by the system (e.g., via virtual sensor data generation system 102 and/or tracker component 112), virtual location data corresponding to the feature of the computer animated character in a virtual environment (e.g., a 3D virtual environment generated, simulated, and/or rendered by virtual environment component 108). In some embodiments, virtual location data can comprise position data and/or rotation data corresponding to a feature of a computer animated character, such as, for example, a point, a vector, and/or a virtual sensor defined at a location of interest (e.g., a wrist) on an avatar and/or a humanoid in a virtual environment. In some embodiments, the computer animated character can correspond to one or more ground truth labels (e.g., walking, running, jumping, etc.).

At 908, based on the virtual location data, generating, by the system (e.g., via virtual sensor data generation system 102 and/or virtual motion sensor component 114), virtual motion sensor data. In some embodiments, the virtual motion sensor data can comprise linear velocity, linear acceleration, angular velocity, angular acceleration, and/or other virtual motion sensor data.

At 910, based on the virtual motion sensor data, training, by the system (e.g., via virtual sensor data generation system 102 and/or model trainer component 502), a predictive model to identify one or more movement activities of an entity. In some embodiments, a predictive model can comprise a machine learning model/algorithm that can identify a human walking based on virtual motion sensor data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
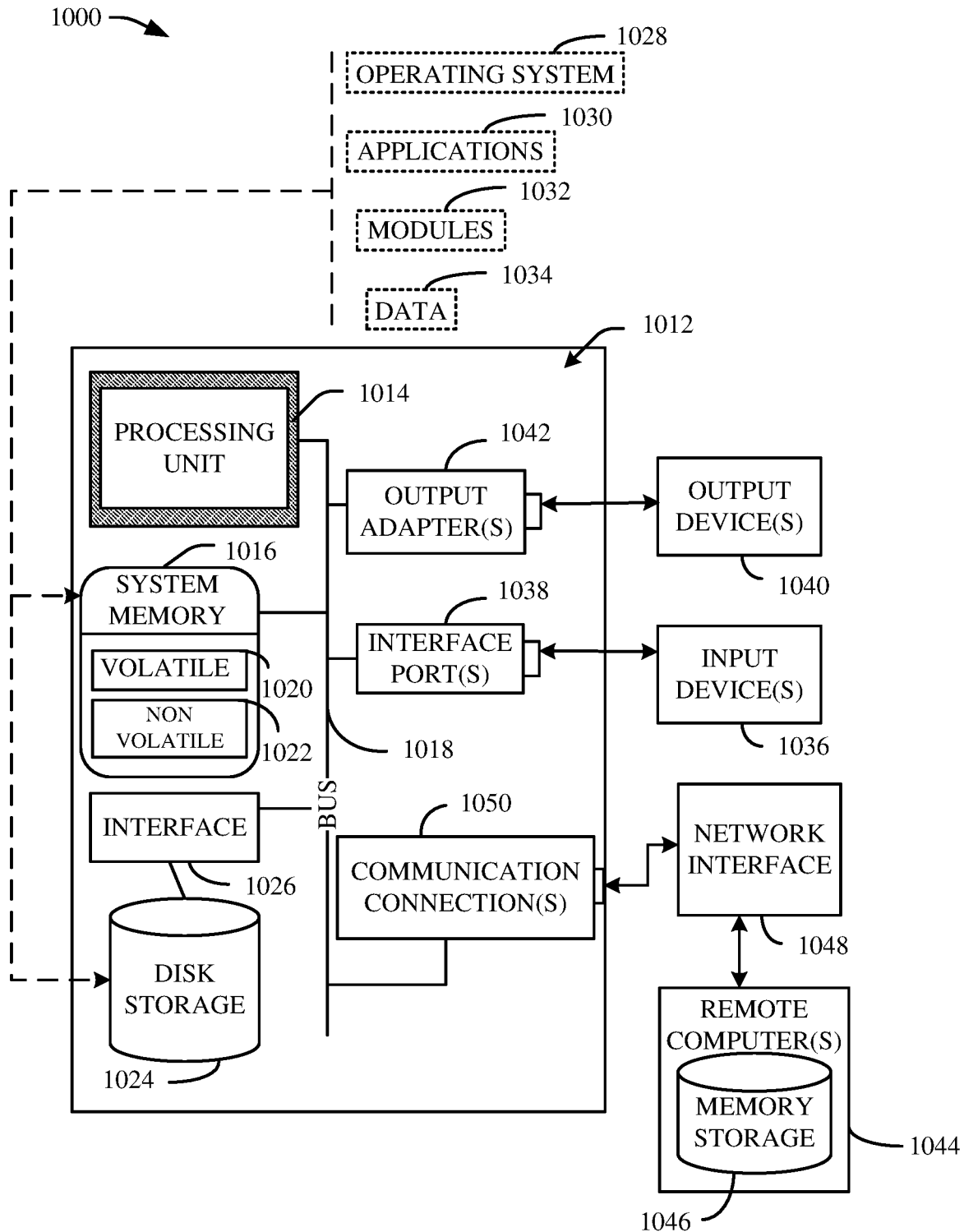
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a tracker component that tracks virtual location data corresponding to a feature of a computer animated character in a virtual environment;
        a virtual motion sensor component that, based on the virtual location data, generates virtual motion sensor data; and
        a model trainer component that, based on the virtual motion sensor data, employs machine learning to train a predictive model to identify one or more movement activities of an entity, wherein the predictive model is trained to dynamically control an amount of random variation to apply to the virtual motion sensor data to identify the one or more movement activities of the entity within a defined range of acceptable variation from the virtual motion sensor data.

2. The system of claim 1, wherein the virtual motion sensor data is selected from the group consisting of linear velocity, linear acceleration, angular velocity, and angular acceleration.

3. The system of claim 1, further comprising a feature definition component that defines at least one of: a position or an orientation of the feature relative to the computer animated character.

4. The system of claim 1, further comprising an animation collection component that collects desired animation movements from pre-existing humanoid computer animations, thereby facilitating at least one of improved performance, improved efficiency, or improved available storage capacity associated with the memory.

5. The system of claim 1, wherein the virtual location data is selected from at least one of: position data or rotation data.

6. The system of claim 1, wherein a virtual sensor is associated with a location of interest of an avatar.

7. The system of claim 1, wherein the computer animated character corresponds to one or more ground truth labels, thereby facilitating at least one of improved processing capacity, improved processing performance, improved processing efficiency, or improved processing time associated with the processor.

8. The system of claim 1, wherein a set of collected computer animations are divided into a first subset of animations that contain desired motor events that can simulate a desired animation movement and a second subset of animations that contain undesired motor events that cannot simulate the desired animation movement, wherein the first subset of animations are positively labeled and the second subset of animations negatively labeled.

9. A computer-implemented method, comprising:
tracking, by a system operatively coupled to a processor, virtual location data corresponding to a feature of a computer animated character in a virtual environment;
based on the virtual location data, generating, by the system, virtual motion sensor data;
based on the virtual motion sensor data, employing, by the system, machine learning to train a predictive model to identify one or more movement activities of an entity, wherein the predictive model is trained to dynamically control an amount of random variation to apply to the virtual motion sensor data to identify the one or more movement activities of the entity within a defined range of acceptable variation from the virtual motion sensor data.

10. The computer-implemented method of claim 9, wherein the virtual motion sensor data is selected from the group consisting of linear velocity, linear acceleration, angular velocity, and angular acceleration.

11. The computer-implemented method of claim 9, further comprising defining, by the system, at least one of a position or orientation of the feature relative to the computer animated character.

12. The computer-implemented method of claim 9, further comprising collecting, by the system, desired animation movements from pre-existing humanoid computer animations, thereby facilitating at least one of improved performance, improved efficiency, or improved available storage capacity associated with the memory.

13. The computer-implemented method of claim 9, wherein the virtual location data is selected from at least one of: position data or rotation data.

14. The computer-implemented method of claim 9, wherein the computer animated character corresponds to one or more ground truth labels, thereby facilitating at least one of improved processing capacity, improved processing performance, improved processing efficiency, or improved processing time associated with the processor.

15. The computer-implemented method of claim 9, wherein a virtual sensor is associated with location of interest of an avatar.

16. A computer program product facilitating a virtual generation of motion sensor data, the computer program product comprising a non-transitory computer readable storage medium having program instructions embodied therewith, the program instructions executable by a processor to cause the processor to:
track, by the processor, virtual location data corresponding to a feature of a computer animated character in a virtual environment;
based on the virtual location data, generate, by the processor, virtual motion sensor data; and
based on the virtual motion sensor data, employ, by the processor, machine learning to train a predictive model to identify one or more movement activities of an entity, wherein the predictive model is trained to dynamically control an amount of random variation to apply to the virtual motion sensor data to identify the one or more movement activities of the entity within a defined range of acceptable variation from the virtual motion sensor data.

17. The computer program product of claim 16, wherein the virtual motion sensor data is selected from the group consisting of linear velocity, linear acceleration, angular velocity, and angular acceleration.

18. The computer program product of claim 16, wherein the program instructions are further executable by the processor to cause the processor to:
define, by the processor, at least one of position or orientation of the feature relative to the computer animated character.

19. The computer program product of claim 16, wherein the program instructions are further executable by the processor to cause the processor to:
collect, by the processor, desired animation movements from pre-existing humanoid computer animations, thereby facilitating at least one of improved performance, improved efficiency, or improved available storage capacity associated with the memory.

20. The computer program product of claim 16, wherein the computer animated character corresponds to one or more ground truth labels, thereby facilitating at least one of improved processing capacity, improved processing performance, improved processing efficiency, or improved processing time associated with the processor.

* * * * *